June 13, 1967 A. R. McMANUS 3,325,431

WAX ETHYLENE-LOWER ALKYL ACRYLATE COPOLYMER HOT MELT ADHESIVE

Filed Oct. 22, 1963

POLYSTYRENE FOAM

ETHYLENE-LOWER ALKYL ACRYLATE COPOLYMER CONTAINING ADHESIVE

INVENTOR.
ALBERT R. McMANUS
BY Bialos & Schlemmer
ATTORNEYS

3,325,431
WAX ETHYLENE-LOWER ALKYL ACRYLATE COPOLYMER HOT MELT ADHESIVE

Albert R. McManus, St. Louis, Mo., assignor to Crown Zellerbach Corporation, San Francisco, Calif., a corporation of Nevada
Filed Oct. 22, 1963, Ser. No. 317,914
10 Claims. (Cl. 260—28.5)

This invention relates to adhesives and more particularly to those of the hot melt type which are of a thermoplastic character and are utilized in molten condition to effect bonding of material on cooling.

Although adhesives of such type are desirable for many purposes, those heretofore employed embodying ethyl cellulose and higher polymer thermoplastics are costly; difficult to manufacture and combine with relatively low melting resins and waxes at temperatures that will not decompose such lower melting materials; subject to rapid degradation when maintained in molten form at the temperature of application thereof; subject to bond failure because of crystallization of the adhesive on aging; are brittle and friable when subjected to cool climatic or to refrigeration conditons; and subject to softening when under warm or hot conditions encountered in hot climates.

The adhesive hereof overcomes the foregoing problems. It has as its objects, among others, the provision of an improved relatively low cost hot melt thermoplastic adhesive composition which is formed from readily available but yet comparatively inexpensive components; is of such character that the components can be readily blended by heat and stirring with conventional blending equipment; has a relatively long pot life at elevated temperatures at which the adhesive is applied to material or articles to bond them; and will maintain a strong but yet flexible bond under both cold and hot conditions to which the set adhesive may ordinarily be subjected. Other objects will become apparent from a perusal of the following description, and accompanying drawings wherein:

Figure 1:
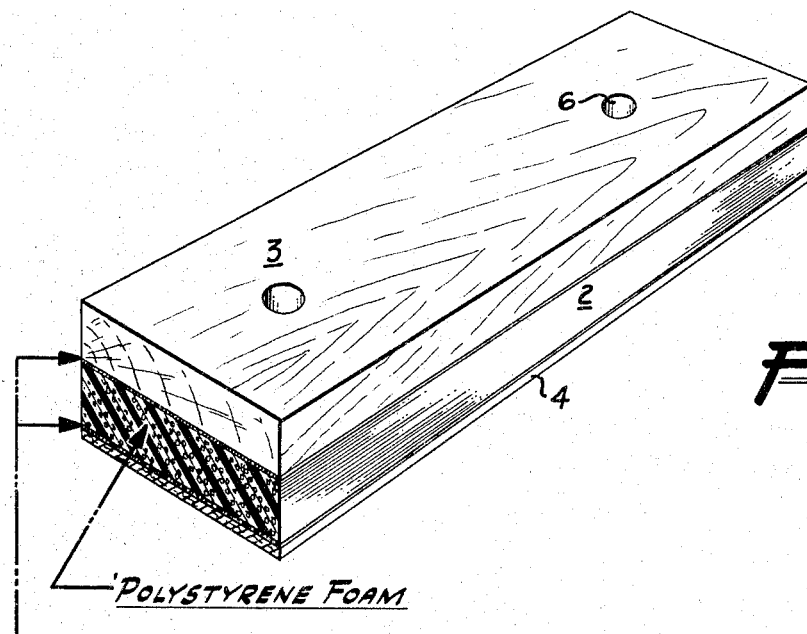
FIG. 1 is an isometric view of an article wherein the adhesive hereof bonds plastic material to other material.

In general, the hot melt adhesive hereof is of the wax type wherein the components comprise a relatively high melting point wax blended with an essential component of the adhesive which imparts advantageous properties thereto, namely an ethylene-lower alkyl acrylate copolymer of the character disclosed in U.S. Patent No. 2,953,551, dated Sept. 20, 1960. A plasticizer is also embodied in the composition for the purpose of enhancing compatibility of the components and adhesion, and for increasing the molten pot life of the adhesive composition. Pot life is important because some bonding operations, such as in bonding a paperboard corrugating medium to paperboard face sheets, are of such nature that the adhesive must be maintained molten without degradation, at an elevated application temperature or repeatedly heated until the entire mass of adhesive is consumed. This time may be as long as twenty-four hours.

Desirably, the composition also includes an extender to increase tackiness and low temperature flexibility. An ethylene-vinyl acetate copolymer; the vinyl acetate content of which is about 27–29 percent by weight, has been found advantageous as an extender. However, the extender may be omitted.

As previously related, the ethylene-lower alkyl acrylate copolymer is an important constituent of the adhesive. Advantageous properties are imparted to wax type hot melt adhesives, with such copolymer ranging from about 7 to 40 percent by weight of the total weight of the composition, and desirably about 10 to 35 percent by weight of the composition.

As is disclosed in the aforementioned Patent No. 2,953,551, the copolymer can be obtained by copolymerizing ethylene with from about 0.2 to about 1.5 moles, and preferably from about 0.4 to about 1 mole, of an alkyl acrylate per 100 moles of ethylene in the presence of a free radical catalyst at pressures of from about 20,000 p.s.i. to about 40,000 p.s.i. or higher; and at polymerization temperatures of from about 100° C. to about 350° C., preferably from about 160° C. to about 350° C. The resultant copolymers have a density of about 0.915 to about 0.94 gram per cc. at 23° C.

Alkyl acrylates employed in the reaction are the lower alkyl acrylates containing from 1 to about 12 carbon atoms in the alkyl radical and preferably from 1 to about 6 carbon atoms in the alkyl radical. Illustrative of the acrylates found suitable are ethyl acrylate, propyl acrylate, pentyl acrylate, 2-ethylhexyl acrylate, decyl acrylate and the like; preferably free of inhibitors which are usually found in alkyl acrylates. The alkyl acrylate concentration is critical, and should be kept within the limits specified in order to achieve the desired products. Exceeding the amounts indicated leads to rubbery, tacky, elastomeric products which are unsatisfactory herein.

Among the catalysts which can be used in effecting the copolymerization are a source of oxygen, such as molecular oxygen which is preferred, and materials which yield oxygen under the reaction conditons, such as peroxide compounds. Illustrative peroxide compounds are hydrogen peroxide, benzoyl peroxide, acetyl peroxide, peracetic acid di-tert.-butyl peroxide, the alkali metal persulfates, perborates and percarbonates, diisopropyl peroxydicarbonate, and the like. The concentration of the catalyst can be varied from about 0.001 to about 5 mole percent based on the total weight of the polymerizable monomers charged. The preferred catalyst is, however, molecular oxygen at a concentration of from about 20 to about 200 parts per million.

The particular ethylene-lower alkyl acrylate copolymer most advantageously employed herein is an ethylene-ethyl acrylate copolymer having about 18 percent by weight of ethyl acrylate, about 82 percent by weight of ethylene, a melt index (gms./10 min.) of about 5 to 7, a softening point (ring and ball) of about 307° F., and a density (gms./cc.) of about 0.931. It is a solid at room temperature and is available as "Bakelite DPDB-6169" by Union Carbide.

Wax employed in the composition imparts fluidity in the molten condition of the adhesive and flexibility to the set adhesive, and serves as an excellent wetting agent for bonding cellulosic fibers. The wax is desirably of a relatively high melting point in the range of 170°–205° F., and preferably 190–205° F. to impart heat resistance to the set adhesive and a relatively long pot life to the molten adhesive. If the wax has a melting point much lower than 170° F., the pot life will be materially decreased, although such lower melting point waxes could be used in cases where pot life is not important. For most advantageous results, micro-crystalline wax is utilized, and preferably "Mekon Brown" by Warwick Wax Division, Western Petrochemical Corporation. Such wax is hard and brittle, and has a melting point (A.S.T.M. D–127–30) of about 195° F.–200° F., a penetration at 100 g./77°/5 sec. of about 3–4, an acid No. of 0, and a saponification value of 0.

As is well known in the thermoplastic blending arts, various plasticizers may be incorporated in wax type hot melt compositions to impart varying characteristics thereto. Plasticizers that may be used are wood rosin, coumaneindene resins, thermoplastic hydrocarbon (terpine) sins, such as Heyden Newport Chemical Corporation's "Nirez 1115" and Pennsylvania Industrial Chemical's "Piccopale 100SF," and chlorinated hydro-carbons, such Diamond Alkali's "Chlorowax 70-S" containing about 70% chlorine by weight. The plasticizer which has been found to produce most advantageous results, is a chlorinated triphenyl having a chlorine content of about 60 percent by weight, an A.S.T.M. softening point of approximately 212° F. to 222° F., available as "Aroclor 5460" by Monsanto Chemical Company.

The combined amounts of the wax and the plasticizer constitute the major amount of the composition, and should be at least about 60 percent by weight of the total weight of the composition, with the wax and the plasticizer in approximately equal quantities plus or minus a variation either way of about 10%.

As an extender for enhancing adhesion and low temperature flexibility in the set composition, an ethylenevinyl acetate copolymer having a vinyl-acetate content in the copolymer of at least 27 percent by weight is desirably incorporated therein. The maximum amount of the vinyl-acetate content is not particularly critical but it is desirable not to exceed about 35 percent by weight because compatibility of the copolymer in the composition may be impaired in view of the diverse polar characteristics of the vinyl-acetate and petroleum wax. The preferred ethylene-vinyl acetate copolymer is "Elvax 220" by Du Pont. It has a vinyl acetate content of about 27-29 percent by weight, melt index of 125-127, viscosity at 30° F. (0.25% by wt. in toluene) of about 0.63, density gm./cc. at 30° C. of about 0.95, and softening point (ring and ball in degrees C.) of about 192. As mentioned previously the ethylene-vinyl acetate copolymer extender may be omitted from the composition but then the amount of ethylene-lower acrylate copolymer should be increased.

The hot melt adhesive hereof is readily produced in a conventional manner, by thoroughly mixing the components of the composition in conventional blending equipment at an elevated temperature until the molten products are thoroughly blended in such molten condition. Upon cooling, the composition forms a solid thermoplastic adhesive mass. However, the preferred manner of mixing the components is to melt them individually and then blend them in the following order: wax, plasticizer, extender when employed, and lastly the ethylene-lower alkyl acrylate copolymer. Because the latter component has the highest viscosity, it is desirable to blend it with the other components last to facilitate the blending.

The following are specific examples of typical formulations which characterize compositions embodying the hot melt adhesive hereof. In such examples, the wax is the aforementioned "Mekon Brown" microcrystalline wax, the plasticizer is the aforementioned chlorinated triphenyl "Aroclor 5460," the ethylene-vinyl acetate copolymer extender is the aforementioned "Elvax 220" and the ethylene-ethyl acrylate copolymer is the aforementioned "DPDB-6169." The proportions are in percent by weight of the total weight of the composition.

method; tests at zero degree F. by flexing bonds between kraft paperboard; and shear tensile tests in a conventional convection oven at the temperature indicated with a 1.0 lb. load placed at right angles to the length of the bond, the bonds being on kraft paperboard.

It will be noted that in all the examples, the pot life at 300° F. was at least twenty-four hours; moreover, degradation did not occur. The adhesives are quite flexible and remain firm at freezing temperature; and at elevated temperatures greater than those encountered under ambient conditions, the bonds are strong.

The range of components in the above examples, 1, 2, 3 and 6 wherein an extender is employed is as follows:

Wax _____ 30 to 40
Ethylene-ethyl acrylate copolymer _____ 10 to 20
Extender _____ 5 to 15
Plasticizer _____ 35 to 45

In bonding materials, the adhesive of all the examples is heated to a molten state at a temperature in the range of about 275-325° F. While the adhesive is maintained in molten condition, it is applied to at least one of the articles to be bonded; and while still molten, the articles are quickly pressed together to cause adherence between the adhesive and the articles. Next the adhesive is merely allowed to cool while adhered to the articles. It sets rapidly in the order of seconds to a solid mass having a firm bond; and when it has cooled to room temperature a very strong bond is established.

An important use for the adhesive thereof is the bonding of plastic material to other material such as cellulosic paperboard or wood; particularly polystyrene foam which is difficult to bond firmly to cellulosic material, such as wood or paperboard. FIGURE 1 illustrates an article employed as a skid board for packages such as large refrigerator carton packages. The skid board comprises a layer of conventional polystyrene foam 2, a wood runner 3 secured to one face of the foam by the adhesive hereof, and paperboard 4 secured to the other face by such adhesive. Holes 6 are adaped to receive fastening elements, such as bolts or nails, for securing the skid board.

A desirable method of applying the adhesive for making the skid board is to apply a molten film of about 0.10″–0.12″ thick directly on the flat surface of a hot plate maintained at 300–325° F. The surface of the polystyrene to be bonded is rubbed in the molten adhesive for about 3 seconds with light pressure. Then it is rapidly joined to the other bonding surface and manually held firmly in place for about fifteen seconds. The bond will develop most of its strength on cooling to room temperature with optimum strength developing within about an hour after cooling.

Figure 2:
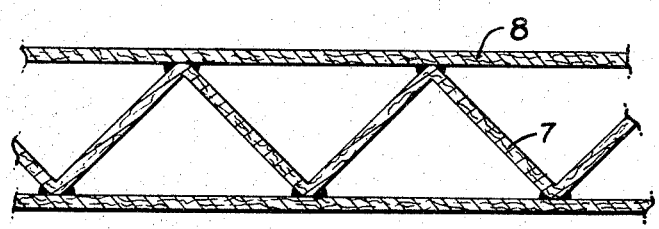
FIG. 2 is a cross-sectional view illustrating the adhesive hereof employed for bonding a corrugating medium to face sheets in corrugated paperboard.

FIGURE 2 illustrates corrugated paperboard of a special type disclosed in assignee's copending application by Walter C. George, Ser. No. 203,275, filed June 18, 1962, and issued as U.S. Patent No. 3,235,432 on Feb. 15, 1966, for Composite Structure and Method of Forming Same, wherein a paperboard corrugating medium 7 has relatively sharp V-shaped crests to which paperboard facing sheets

| Example Number | 1 | 2 | 3 | 4 | 5 | 6 |
| --- | --- | --- | --- | --- | --- | --- |
| Wax | 35 | 40 | 30 | 35 | 30 | 40 |
| Plasticizer | 40 | 45 | 35 | 40 | 35 | 35 |
| Extender | 10 | 5 | 15 | 0 | 0 | 10 |
| Ethylene-Ethyl Acrylate Copolymer | 15 | 10 | 20 | 25 | 35 | 15 |
| Minimum Pot Life at 300° F., in Hours | 24 | 24 | 24 | 24 | 24 | 24 |
| Viscosity at 300° F., Centipoises | 11,500 | 1,300 | 33,500 | 16,750 | 52,500 | 8,000 |
| Tensile Strenth at 75° F., p.s.i | 1,110 | 1,390 | 820 | 1,240 | 1,040 | 1,170 |
| Condition of Bonds on Kraft Paper Board at at Zero Degree F | (¹) | (¹) | (¹) | (¹) | (¹) | (¹) |
| Minimum Temperature in Degrees F. at Which Bonds Will Fail Under Shear-tensile Stress | 178 | 172 | 174 | 178 | 174 | 172 |

¹ Firm.

In the above examples, the viscosity tests were made with a conventional Brookfield Viscosimeter; tensile strength determination according to A.S.T.M. D 412-51T 8 are bonded by the adhesive hereof. In the manufacture of such corrugating medium, no moisture other than that inherently present in the paper is required to make the corrugations. The hot melt adhesive provides a very strong bond of increased strength between the relatively sharp crests and the facing sheet, compared to water soluble adhesives heretofore commonly used in the manufacture of conventional paperboard corrugating medium with rounded crests wherein the paper is subjected to added moisture to effect the corrugating. This is so because water base adhesives are dependent on substantial area of adhesive bond, while the adhesive hereof provides a strong bond with small areas, such as the V-shaped crests.

Although specially applicable to bonding a corrugating medium of the special type mentioned, to a facing sheet, the adhesive hereof can also be advantageously employed for bonding facing sheets to conventional rounded-crest corrugating medium because its rapid set enhances high speed corrugating paperboard manufacture wherein the facing sheets and corrugating medium are continuously brought together for bonding. Two facing sheets are shown in the drawing but the corrugating medium may be made secured to only one facing sheet.

In the above formulations, that of Example 1 has found great applicability for the bonding of V-shaped crests of the aforementioned corrugating medium to facing sheets. It also has excellent adherence to polyethylene, and polystyrene foam, and is used for bonding polyethylene coated solid fibreboard to other materials and to itself. Example 3 is excellent for effecting fast bonding of relatively dense surfaces, such as solid fibreboard. The formulation of Example 6 is excellent for bonding of molded forms of expanded polystyrene to solid fibreboard or wood where a slightly longer setting time is desirable when pressing of the articles together is effected by hand. The other Examples 2, 4 and 5 are also useful for the aforementioned purposes, and illustrate by comparison with Examples 1, 3 and 6 how variations in the components primarily affect the viscosity characteristics at 300° F. but do not materially affect tensile strength which is imparted by the ethylene-lower alkyl acrylate copolymer.

I claim:

1. A hot melt adhesive for bonding articles upon solidification of the adhesive from molten condition, and which sets relatively fast from mid molten condition to a solid mass, is heat resistant, has a relatively long pot life in said molten condition without substantial degradation thereof, and wettability for bonding cellulosic fibers, said adhesive comprising wax having a melting point of about 170° to 205° F., an ethylene-ethyl acrylate copolymer, and a chlorinated triphenyl plasticizer; the combined amounts of the wax and the plasticizer constituting the major amount of the composition; and said copolymer being the reaction product under heat and pressure of about 0.2 to 1.5 moles of an ethyl acrylate per 100 moles of ethylene.

2. A hot melt adhesive for bonding articles upon solidification of the adhesive from molten condition, and which sets relatively fast from mid molten condition to a solid mass, is heat resistant, has a relatively long pot life in said molten condition without substantial degradation thereof, and wettability for bonding cellulosic fibers, said adhesive consisting essentially of wax having a melting point of about 170° to 205° F., an ethylene-ethyl acrylate copolymer, an ethylene-vinyl acetate copolymer extender, and a chlorinated triphenyl plasticizer; the combined amounts of the wax and the plasticizer constituting the major amount of the composition; and said ethylene-ethyl acrylate copolymer constituting about 7 to 40% of weight of the composition and being the reaction product under heat and pressure of about 0.2 to 1.5 moles of an ethyl-acrylate per 100 moles of ethylene.

3. A hot melt adhesive for bonding articles upon solidification of the adhesive from molten condition, and which sets relatively fast from mid molten condition to a solid mass, is heat resistant, has a relatively long pot life in said molten condition without substantial degradation thereof, and wettability for bonding cellulosic fibers, said adhesive comprising wax having a melting point of about 190 to 205° F., an ethylene-ethyl acrylate copolymer; a chlorinated triphenyl plasticizer; the combined amounts of the wax and the chlorinated triphenyl plasticizer constituting at least about 60% by weight of the composition; and said copolymer constituting about to 40 percent by weight of the composition, and having about 18% by weight of ethyl acrylate, about 82% by weight of ethylene, a melt index (gms./10 min.) of about 5 to 7, a softening point (ring and ball) of about 307 F., and a density (gms./cc.) of about 0.931.

4. The hot melt adhesive of claim 3 in which the proportions in percent by weight are about:

| | |
|---|---|
| Wax | 35 |
| Ethylene-ethyl acrylate copolymer | 25 |
| Chlorinated triphenyl | 40 |

5. The hot melt adhesive of claim 3 in which the proportions in percent by weight are about:

| | |
|---|---|
| Wax | 30 |
| Eethylene-ethyl acrylate copolymer | 35 |
| Chlorinated triphenyl | 35 |

6. A hot melt adhesive for bonding articles upon solidification of the adhesive from molten condition, and which sets relatively fast from mid molten condition to a solid mass, is heat resistant, has a relatively long pot life in said molten condition without substantial degradation thereof, and wettability for bonding cellulosic fibers, said adhesive consisting essentially of microcrystalline wax having a melting point of about 190 to 205° F., an ethylene-ethyl acrylate copolymer, an ethylene-vinyl acetate copolymer extender having a vinyl acetate content of about 27 to 29 percent by weight, and chlorinated triphenyl plasticizer having a chlorine content of about 60% by weight; said ethylene-ethyl acrylate copolymer having about 18% by weight of ethyl acrylate, about 82% by weight of ethylene, a melt index (gms./10 min.) of about 5 to 7, a softening point (ring and ball) of about 307° F., and a density (gms./cc.) of about 0.931; the proportions of the foregoing in said composition in percent by weight being about:

| | |
|---|---|
| Wax | 30 to 40 |
| Ethylene-ethyl acrylate copolymer | 10 to 20 |
| Ethylene-vinyl acetate copolymer | 5 to 15 |
| Chlorinated triphenyl | 35 to 45 |

7. The hot melt adhesive of claim 6 in which the proportions in percent by weight are about:

| | |
|---|---|
| Wax | 35 |
| Ethylene-ethyl acrylate copolymer | 15 |
| Ethylene-vinyl acetate copolymer | 10 |
| Chlorinated triphenyl | 40 |

8. The hot melt adhesive of claim 6 in which the proportions in percent of weight are about:

| | |
|---|---|
| Wax | 30 |
| Ethylene-ethyl acrylate copolymer | 20 |
| Ethylene-vinyl acetate copolymer | 15 |
| Chlorinated triphenyl | 35 |

9. The hot melt adhesive of claim 6 in which the proportions in percent by weight are about:

| | |
|---|---|
| Wax | 40 |
| Ethylene-ethyl acrylate copolymer | 15 |
| Ethylene-vinyl acetate copolymer | 10 |
| Chlorinated triphenyl | 35 |

10. The hot melt adhesive of claim 6 in which the proportions in percent by weight are about:

| | |
|---|---|
| Wax | 40 |
| Ethylene-ethyl acrylate copolymer | 10 |
| Ethylene-vinyl acetate copolymer | 5 |
| Chlorinated triphenyl | 45 |

(References on following page)

References Cited

UNITED STATES PATENTS

| | | |
|---|---|---|
| ,480,298 | 8/1949 | Happoldt. |
| ,845,398 | 7/1958 | Brown et. al. _____ 260—28.5 |
| ,953,541 | 9/1960 | Pecha et. al. _____ 260—28.5 |
| ,972,559 | 2/1961 | Allen et. al. |
| 3,085,026 | 4/1963 | Weisgerber et. al. ____ 260—28.5 |
| 3,175,986 | 3/1965 | Apikos et. al. _____ 260—28.5 |
| 3,201,498 | 8/1965 | Brunson et. al _____ 260—28.5 |
| 3,215,657 | 11/1965 | Beresniewicz et. al __ 260—28.5 |

MORRIS SUSSMAN, *Primary Examiner*.